United States Patent [19]

Kogan et al.

[11] Patent Number: 5,529,660
[45] Date of Patent: Jun. 25, 1996

[54] METHOD OF REDUCING FLUORESCENCE IN DEINKED PULP BY TREATING PULP WITH OZONE AND A BLEACHING AGENT

[75] Inventors: Jack Kogan, Skokie; Michelle Steiner, Westmont, both of Ill.

[73] Assignee: L'Air Liquide, Societe Anonyme Pour l'Etude et l'Exploitation des Procedes Georges Calude, Paris, France

[21] Appl. No.: 227,882

[22] Filed: Apr. 15, 1994

[51] Int. Cl.$^6$ .......................... D21C 5/02; D21C 9/153; D21C 9/16

[52] U.S. Cl. .................... 162/4; 162/6; 162/65; 162/78

[58] Field of Search .................. 162/65, 78, 5, 162/7, 4, 6

[56] References Cited

U.S. PATENT DOCUMENTS

| | | | |
|---|---|---|---|
| 5,211,809 | 5/1993 | Naddeo et al. | 162/6 |
| 5,302,245 | 4/1994 | Nadeau | 162/4 |
| 5,346,588 | 9/1994 | Sixta et al. | 162/65 |

FOREIGN PATENT DOCUMENTS

| | | |
|---|---|---|
| 0426652 | 5/1981 | European Pat. Off. . |
| 3199477 | 8/1991 | Japan . |

OTHER PUBLICATIONS

Kobayashi et al, "Effects of Multistage Ozone Bleaching Process of Pulp", *Japan Tappi;* Jun. 1976, pp. 42–47.

La Papeterie, No. 176, Feb. 1994, FR pp. 30–33, Dulion, C.; Kogan, J.; Muguet, M; Rabergeau, G., "L'ozone s'attaque aussi aux vieux papiers".

Database WPI, Section Ch, Week 7647, Derwent Publications Ltd., London, GB; Class F09, AN 76–87681X & JP-A-51 112 904 (Agency Of Ind Sci Tech) 6 Oct. 1976.

*Primary Examiner*—Steven Alvo
*Attorney, Agent, or Firm*—Burns, Doane, Swecker and Mathis

[57] ABSTRACT

Provided herewith is a process for reducing the fluorescence of pulp fibers. The process comprises contacting the pulp fibers with ozone in two or more stages, with an intermediate washing stage or bleaching stage preferably being conducted in between the ozone contacting stages. It has been discovered that splitting the total ozone charge into two or more stages provides a much more efficient and effective process for reducing fluorescence.

7 Claims, 7 Drawing Sheets

METHOD OF REDUCING FLUORESCENCE IN DEINKED PULP BY TREATING PULP WITH OZONE AND A BLEACHING AGENT

BACKGROUND OF THE INVENTION

The present invention relates to a method useful in reducing the fluorescence in secondary fibers. Therefore, the present invention finds particular application in a recycling process for used paper which contains fluorescent dye. More specifically, the present invention comprises a method which more effectively employs ozone in reducing the fluorescence of pulp fibers, and especially deinked pulp fibers.

Environmental considerations have generated a growing trend toward increased utilization of recycled fibers. Recycled fiber furnishes, which are generally obtained through the recycle of used or waste paper, e.g., newspaper, often contain fluorescent dyes which are believed to be possible carcinogens. Food board manufacturers, responding to environmentally driven pressures, would like to include secondary fibers in their furnish. However, it is unacceptable to have possible carcinogens in contact with food. Conventional fiber treatment methods, unfortunately, have little defluorescence activity with regard to fluorescent dye containing paper.

One possible alternative in order to more effectively reduce the fluorescence of recycled fibers is to treat recycled pulp with chemical quenchers. It should be noted that quenchers are expensive, however, and have no bleaching effect. Therefore, the pulp must be bleached and separately treated with the quencher. Some bleaching chemicals, such as hydrogen peroxide, can actually increase fluorescence.

The use of chlorine compounds can be considered for the neutralization of fluorescent dyes as chlorine compounds do bleach and attack fluorescent dyes. However, new environmental regulations require that the level of organochlorine compounds in mill effluents be reduced to a minimum.

The use of ozone in the treatment of recycled fibrous material for different reasons is known. For example, Japanese patent application 61-192381 concerns a process for waste treatment which employs ozone. Ozone is infiltrated through the fibrous waste material in order to remove residual butyric acid and fatty acids and for the purpose of deodorization. The fibrous material can then be used for the fabrication of fiber sheets.

Similarly, in German patent application 3001862, published Jul. 23, 1981, there is disclosed a process for the production of a raw material useful for making paper from waste paper. In the process, the waste paper itself is treated with a gaseous disinfecting agent, such as ozone. Subsequent to the treatment, the waste paper is subjected to a recycling procedure, for example, involving solvent treatment and fibrillation. The waste paper, due to its contact with household garbage, is generally strongly contaminated with bacteria and microorganisms. The use of the ozone disinfectant agent destroys the bacteria and microorganisms to permit odor free, safe subsequent handling of the paper.

The use of ozone as a bleaching agent for pulp is also known. See, for example, "Bleaching Deinked Pulp with Ozone" by Jack Kogan and Michel Muguet, *Progress and Paper Recycling*, November, 1992.

The use of ozone for treating used paper is also disclosed in Japanese Kokai 3199477. The process described, however, uses the ozone to decolorize and defluoresce the used paper. The process involves the reaction of ozone with the used paper in a slurry dispersion comprised of at least 20% water.

Thus, ozone is known to be useful in processes treating recycled paper, and is known to reduce fluorescence in an environmentally friendly manner. Greater expediency and efficiency, however, with regard to the use of ozone in the treatment of paper, and in particular in overcoming the problems of extinguishing fluorescence, would be welcome in the paper industry. For to render such a defluorescence process more effective and efficient would make the process more desirable and aid in the use of recycled fibers in applications where heretofore they have not been used.

Accordingly, one object of the present invention is to provide a novel process for reducing fluorescence in fibers such as secondary fibers.

Yet another object of the present invention is to provide a cost effective and efficient process for treating recycled pulp containing fluorescent dye.

These and other objects of the present invention will become apparent upon a review of the following specification, the figures of the drawing, and the claims appended thereto.

SUMMARY OF THE INVENTION

In accordance with the foregoing objectives, provided herewith is a process for reducing the fluorescence of pulp fibers. The process comprises contacting the pulp fibers with ozone in two or more stages, with an intermediate washing stage or bleaching stage preferably being conducted in between the ozone contacting stages. It has been discovered that splitting the total ozone charge into two or more stages provides a much more efficient and effective process for reducing fluorescence.

In another embodiment, there is provided a process for recycling fluorescent dye containing paper. The process comprises first pulping (fibrillating) and deinking the paper, and then treating the deinked pulp fibers with sufficient ozone in two separate treatments to reduce the fluorescence of the treated fibers. The completed ozone treatment can then be followed by a bleaching and/or washing step.

It has been discovered that the process of the present invention, when using the same amount of ozone, bleaching chemicals and/or water, provides a much more effective deflorescence, and even brightness, as compared to the use of a single ozone treatment. This surprising result increases the attractiveness of using recycled fibers in food board as well as other applications where the presence of fluorescent dyes are unacceptable. The present invention thereby offers a cost effective, efficient and environmentally friendly process for achieving increased use of recycled fibers in many different applications.

DETAILED DESCRIPTION OF THE PREFERRED EMBODIMENTS

Figure 1:
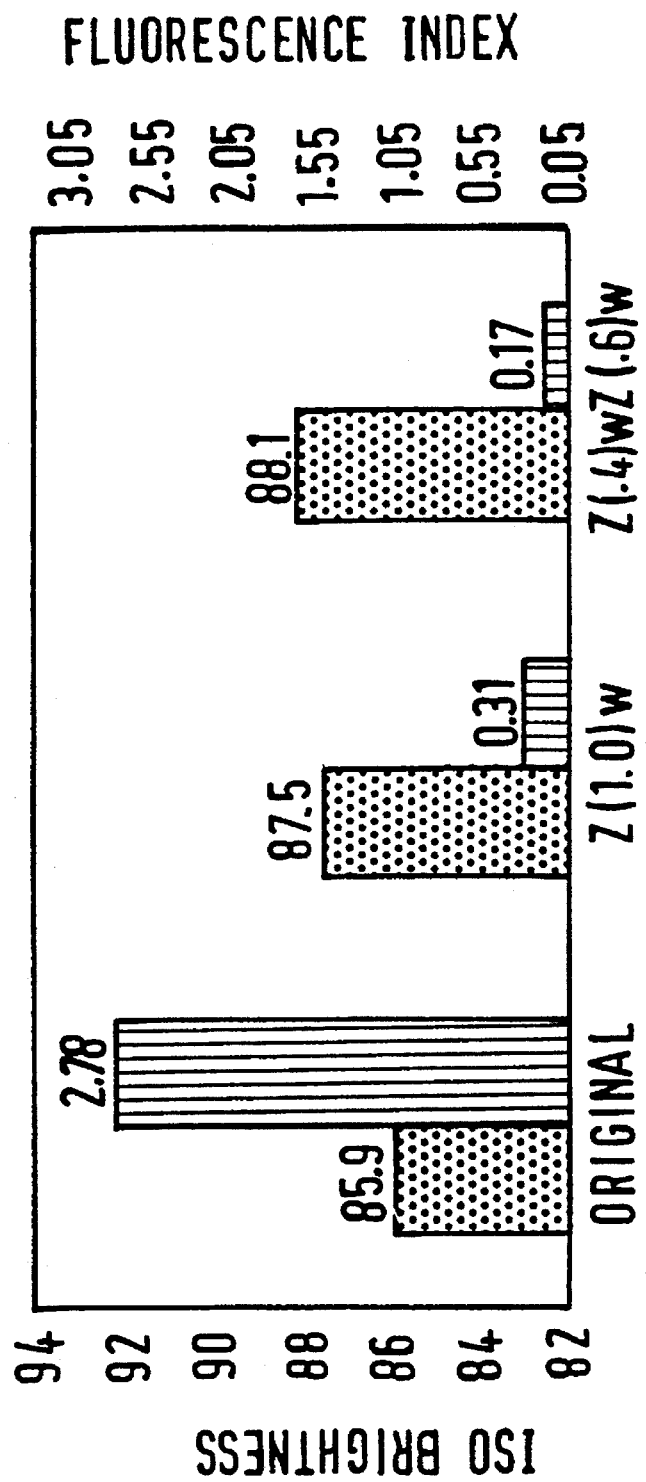
FIGS. 1–7 of the Drawing are graphical depictions of runs comparing a split stage ozone treatment conducted in accordance with the present invention and a process using a single ozone charge.

The present invention relates to a process for the reduction of fluorescence in secondary fibers by using ozone. Bleaching of the pulp fibers by commercial means is also surprisingly improved by this process. Generally, the present invention is based in part upon the discovery that sequences which split the total ozone charge into two or more stages are more efficient than single ozone applications. Between the two ozone stages, washing or bleaching can be applied. Thus, if Z=ozone and w=washing, a sequence of Z w Z has been found to be better than Z or Z w when the total ozone consumption is the same.

The fibers which can be treated in accordance with the present invention can be any fiber known which can be used, e.g., slurried, for making sheet material which fibers contain a fluorescent dye. Generally, the fiber pulp will be obtained through a paper recycling process wherein used or waste paper is recycled. Paper which is fluorescent-whitened, which paper is generally prepared by the internal addition and/or coating of a fluorescent dye, is prevalent in the paper industry. The process of the present invention has particular application in the defluorescence of such paper.

The ozone used in the process of the present invention can be readily obtained commercially, or it can be produced on site. Ozone is generally produced by electrical discharge from pure oxygen or from purified air. There are many advantageous ozone generation systems which use oxygen as the feeding gas. Such systems are highly efficient, of relatively small size and flexible enough to produce ozone according to variable demands. Accordingly, the ozone gas used in connection with the practice of the present invention can be easily supplied on site according to mill requirements and plant configurations, if so desired.

Once the ozone is produced, the ozone can be utilized in gaseous form, e.g., a mixture of ozone and oxygen, air or other carrier gas, or as a concentrated solution of ozone. When the ozone is used in gaseous form, the ozone gas (or mixture of ozone and oxygen) is generally injected into a reactor which contains the pulp to be treated. The reactor can be any suitable container having an inlet and outlet for the ozone and an inlet and outlet for the pulp, preferably with mixing means. For example, a rotary glass reactor wherein mixing is achieved by rotation can be used. The gas injection can go on during a precalculated reaction time such as in a batch process. Otherwise, the contacting of the ozone with the pulp can be on a continuous basis with the pulp and ozone constantly being passed through the reactor. In such a continuous process, it must be assured that sufficient contact of the ozone with the pulp is achieved. The ozone gas can be injected under pressure or at almost atmospheric conditions, depending on the type of technology used. For example, at medium consistency (10–15% solids, 85–90% water), the ozone is preferably injected at 6–12 bars. At high consistency (30–40% solids, 60–70% water), ozone can be injected at 1–2 bars. When a solution of ozone is used, a similar reactor or contactor can be used with appropriate equipment to permit the entry and exit of liquid instead of gas.

The duration of the contact will vary depending on the result desired to be achieved, as well as other factors which are all well known to the skilled artisan. For example, the contact time of the ozone stage is dependent on factors such as concentration of ozone in oxygen or air, sample size, charge applied, and consistency. The retention time at medium or high consistency is generally from 1–15 minutes. For the purposes of the present invention, the total contact time will generally comprise from 1 to 30 minutes, and more preferably from 1 to 15 minutes.

It is preferred that each of the ozone contact stages are of equal duration, although it is not necessary to split the ozone application in half. For example, the amount of ozone used in the first contact can be from 90 to 10 weight % of the total ozone used, with from 10 to 90 weight % ozone being used in the second ozone contact. In a specific embodiment, at least 50% by weight ozone is used in the first ozone contact step, and then the pulp is washed. The remaining amount of ozone is then used in the second ozone contact step, or a measurement of fluorescence is done to determine if more or less than the remaining amount of ozone is necessary to optimize the result.

The total amount of ozone used is generally in the range of from 0.2 to 2.0 wt % based on the weight of the dry pulp. More preferably, the total amount of ozone used for the defluorescence treatment is in the range of from about 0.5 to 1.5 wt %, based upon the weight of the dry pulp. The total amount of ozone to be used is preferably divided equally among the two or more stages of ozone treatment that takes place.

An intermediate step of washing or bleaching, or actually any treatment with an aqueous solution, can be employed between the stages of ozone contact. Such an intermediate step removes undesirable byproducts of oxidation, thereby making the second ozone application more effective by leaving a larger portion of the ozone available to react with the fluorescent dyes.

The bleaching step can be run in accordance with any of the conventionally known processes for bleaching pulp. Generally, the conventional bleaching chemicals such as sodium hydroxide, silicates and DTPA are added together, optionally with water, in a container to adjust consistency. Hydrogen peroxide or some other conventional bleaching chemical can then be added as the last chemical to the bleaching liquor. The pulp to be treated is generally contained in a suitable contained area, such as a conventional bleaching tower. The bleaching liquor is then added to the pulp, with mixing of the pulp in contact with the bleaching liquor then taking place.

In a specific embodiment, the bleaching stage can be also followed with a washing stage prior to the second ozone application. Thus, a sequence such as Z X w Z is contemplated, where Z is an ozone treatment, X is a bleaching stage and w is a water or aqueous solution stage.

In general, any conventional bleaching conditions can be used. As an example of such conditions, the hydrogen peroxide charge is generally in the range of from about 0.3 to 5 wt %, based on the weight of oven dried pulp. If sodium hydroxide is used, the charge is generally in the range from about 0.3 to 3.0 wt % based upon the weight of the oven dried pulp. If silicates are used, the charge is in the range of from about 2.0 to 3.0 wt % based upon the weight of the oven dried pulp. If DTPA is used, the charge is generally in the range of from about 0.2 to 0.3 wt % based upon the weight of the oven dried pulp. The temperature of the mixture of pulp and bleaching liquor is generally maintained in the range of from about 60° to 70° C., with the bleaching reaction time ranging from about 60 to 180 minutes.

In a preferred embodiment, fluorescent dye containing paper is recycled by first pulping (fibrillating) and deinking the paper. The resulting pulp can then be treated with sufficient ozone in two or more separate treatments to reduce the fluorescent dye content of the pulp. The pulp can then be used to produce paper products with very low fluorescence index or non-fluorescent paper products. One example is food board. As the process of the present invention permits one to reduce the fluorescence in a most effective and efficient manner, the process makes the commercial use of recycled fibers in food board more attractive and possible.

The present process has also been found to provide improved brightness, as an added benefit. The use of ozone also has the benefit of disinfecting and deodorizing the recycled paper, thereby permitting one to obtain a clean, reclaimed paper.

The invention will be illustrated in greater detail by the following specific examples. It is understood that these examples are given by way of illustration and are not meant to limit the disclosure of the claims to follow. All percentages in the examples, and elsewhere in the specification, are by weight (of oven dried pulp) unless otherwise specified.

EXAMPLE 1

The following Example demonstrates comparatively how the process of the present invention provides improved fluorescence, as well as brightness, as compared to the use of a single stage ozone treatment.

THE PULP SAMPLES

Several pulp samples were used for this experiment. All of the furnishes were composed of post consumer waste paper with low (less than 5%) mechanical pulp content and high initial fluorescence index.

Z(OZONE) STAGE

Ozone treatments were carried out at ambient temperature and high consistency. Water was extracted from the pulp in order to reach 37–43% consistency. The pulp was then fluffed in a laboratory fluffer and placed in a rotary evaporator to which ozone gas was injected.

Ozone gas was produced in a 7 g/hr ozone generator. The concentration of ozone produced and the quantity of ozone not consumed by the reaction were measured by iodometric titration.

WASHING BETWEEN SPLIT OZONE STAGES

Pulp was removed from the ozone reactor with distilled water. The pulp was washed with filtered tap water and thickened to medium consistency. Next, the sample was diluted to low consistency with distilled water and mixed. Finally, the pulp was brought to high consistency by centrifugation and fluffed.

HANDSHEETS

Handsheets were produced according to TAPPI procedures. Filtered tap water was used. ISO brightness and fluorescence index were measured using an Elrepho Spectrophotometer.

FLUORESCENCE MEASUREMENT

The fluorescence routine allows the brightness of a sample to be measured both with and without the optical brighteners in the sample being excited. First a normal brightness reading is taken while the sample is being illuminated with full spectrum light including ultraviolet energy. If optical brighteners were present in the sheet, they would be excited by the ultraviolet energy and this component of fluorescence will add to the intrinsic brightness of the sheet. After this measurement was taken, the ultraviolet cutoff filters were inserted into the light beams. Since the ultraviolet light was excluded from this reading, the fluorescent brighteners were not excited. The difference between these two readings was referred to as the "fluorescent component of brightness" or simply "fluorescence". If the sample contained no optical brighteners, the fluorescence should be very close to zero.

The results of the experimental runs are set forth in Table 1 below:

TABLE 1

| SEQUENCE | FLUORESCENCE INDEX | | | ISO BRIGHTNESS | | |
|---|---|---|---|---|---|---|
| | Pulp A | Pulp B | Pulp C | Pulp A | Pulp B | Pulp C |
| original | 2.78 | 2.99 | 1.92 | 85.9 | 78.9 | 70.7 |
| Z | 0.31 | 0.61 | 0.85 | 87.5 | 84.6 | 78.7 |
| Z w Z | 0.17 | 0.41 | 0.54 | 88.1 | 86.0 | 81.6 |

NOTE:
Total ozone consumption for both Z and Z w Z = 1.0%

Figure 2:
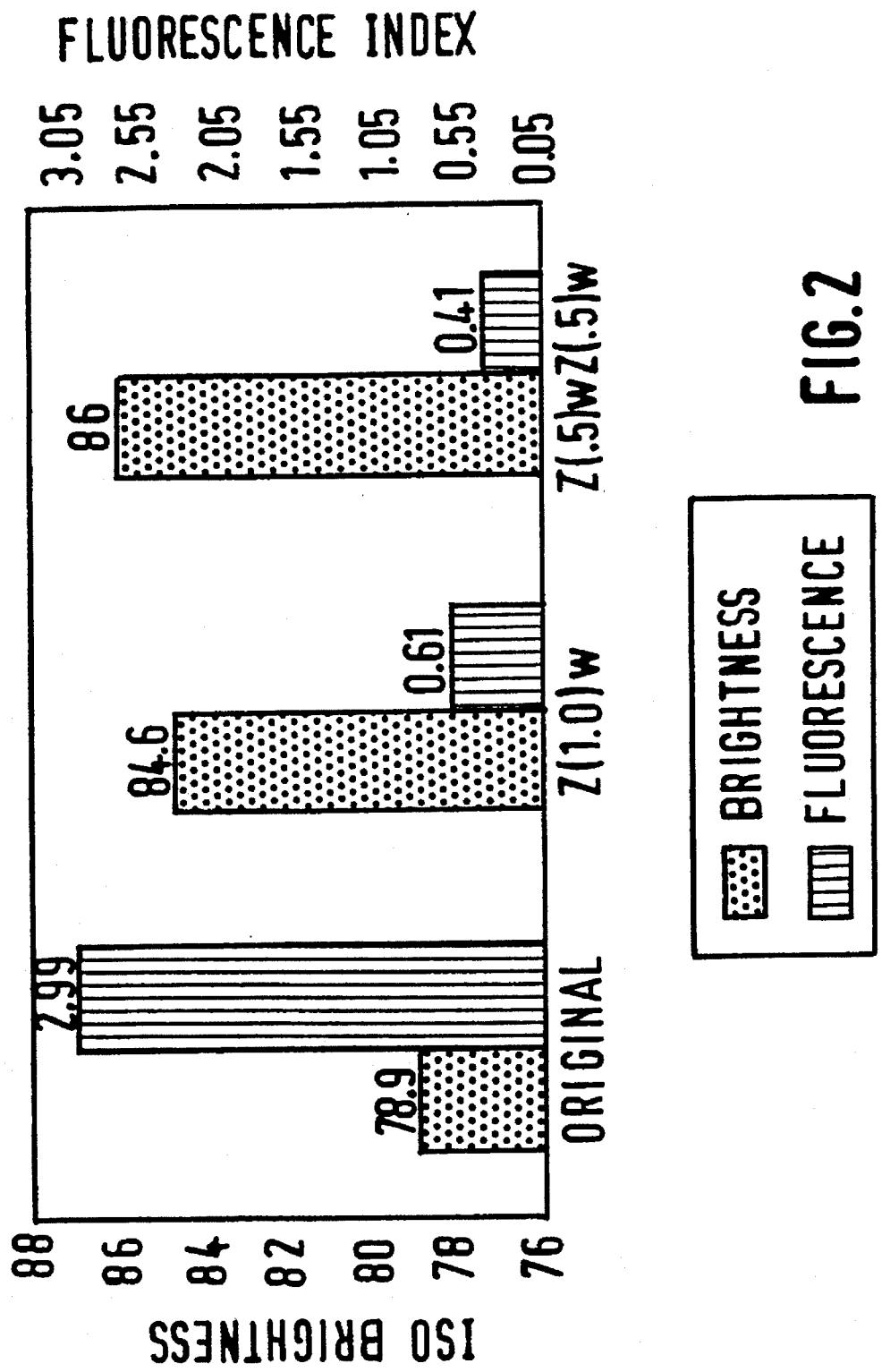
Figure 3:
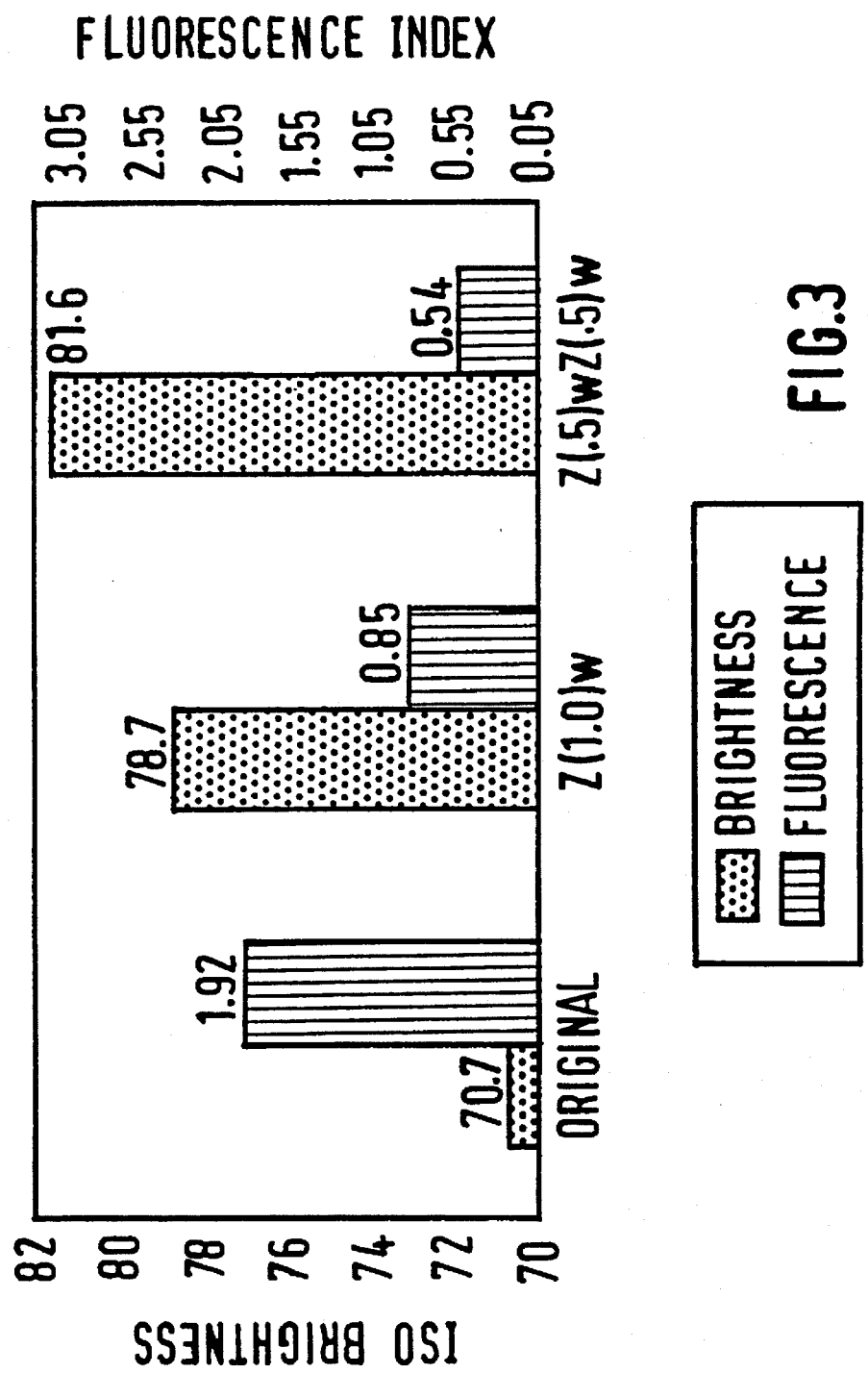
Figure 4:
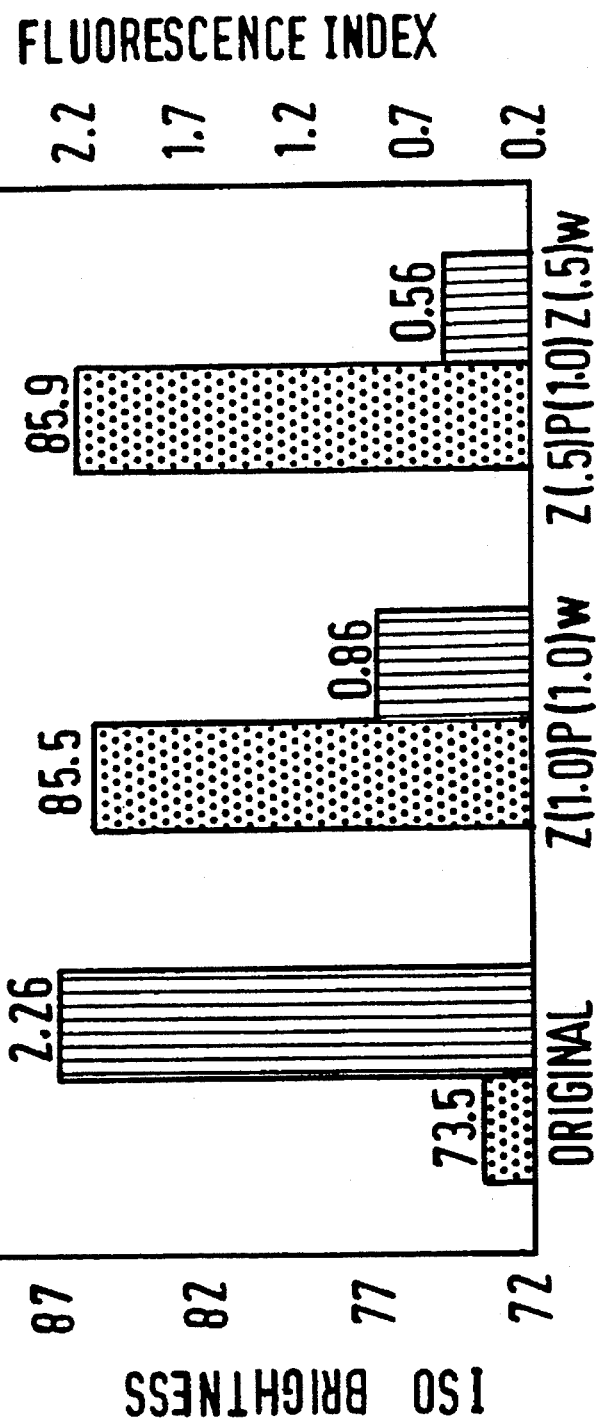
Figure 5:
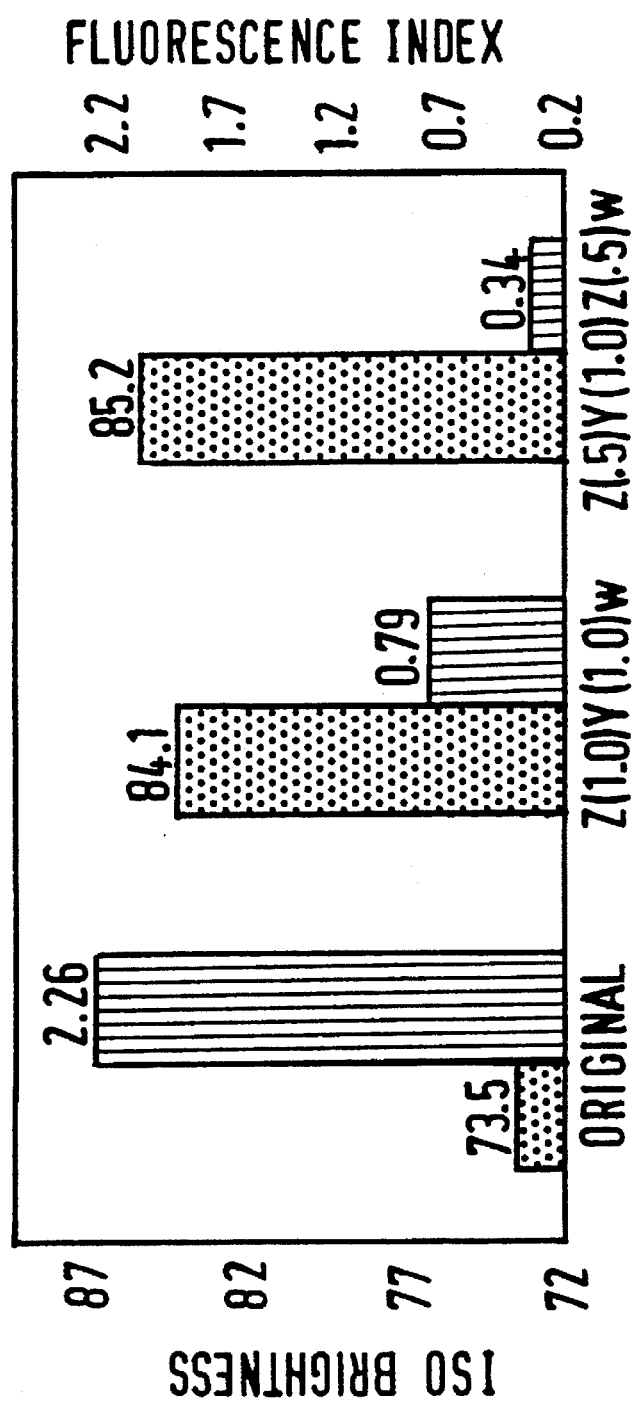
Figure 6:
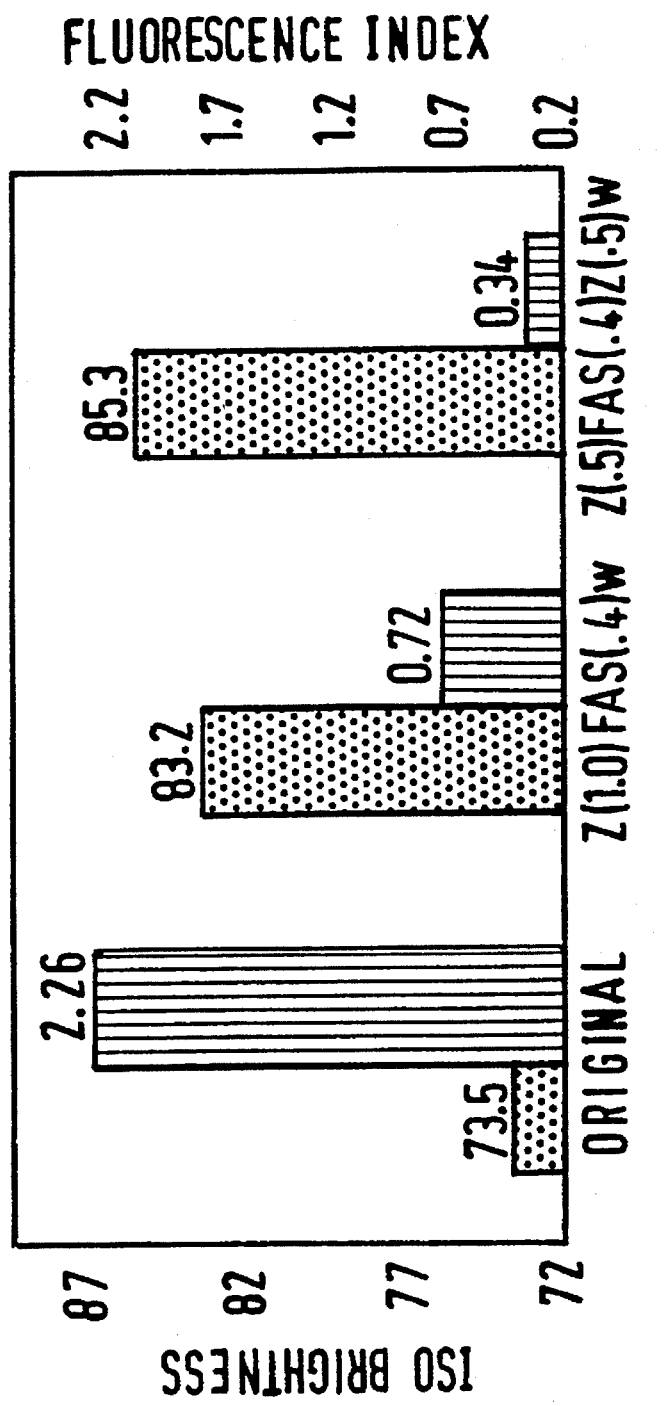
Figure 7:
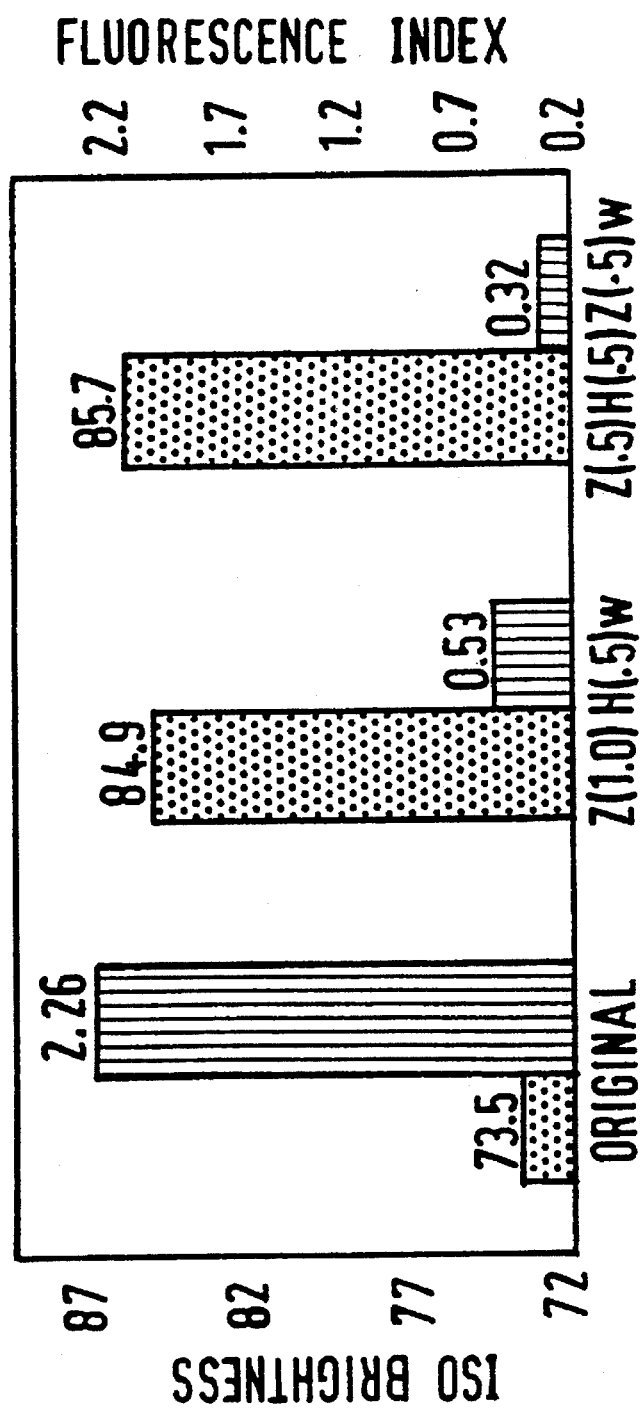

FIG. 1 of the drawing graphically depicts the results of measured fluorescence and Iso brightness for the single ozone application and the split zone charge in two stages in accordance with the present invention. FIG. 2 graphically depicts similar results for Pulp B, while FIG. 3 graphically depicts the results for Pulp C.

EXAMPLE 2

Example 1 was repeated except that the washing stage was replaced by a bleaching stage followed by dewatering (to high consistency) and consequent removal of undesirable byproducts of the reaction. Runs using both hydrogen peroxide (P) and hypochlorite (H) as the bleaching chemical were made. The results are shown below in Table 2.

TABLE 2

| SEQUENCE | FLUORESCENCE | ISO BRIGHTNESS |
|---|---|---|
| original | 1.03 | 61.5 |
| Z P | 0.85 | 74.2 |
| Z P Z | 0.59 | 77.0 |
| Z H | 0.85 | 78.5 |
| Z H Z | 0.70 | 80.0 |

NOTES:
Total ozone consumption for both Z and Z x Z = 0.6%
Charge of hydrogen peroxide (P) = 0.3%
Charge of sodium hypochlorite (H) = 0.5%

From the foregoing, it can be seen that the split addition of the present invention provides a superior result. In other words, when X=any bleaching chemical, Z X Z was found to be better than Z X for the same total ozone consumption.

EXAMPLE 3

The procedure of Example 2 was again followed, with the split addition being compared to several sequences using different bleaching chemicals. Runs using hydrogen peroxide (P), hypochlorite (H), sodium hydrosulfite (Y) and formamidine sulphinic acid (FAS) were made. The results are shown in Table 3 below. The results are graphically depicted in FIGS. 4–7 of the drawings.

TABLE 3

| SEQUENCE | FLUORESCENCE INDEX | ISO BRIGHT- NESS | TOTAL % O₃ CON- SUMPTION. |
|---|---|---|---|
| original | 2.26 | 73.5 | — |
| Z P | 0.86 | 85.5 | 1.00 |
| Z P Z* | 0.56 | 85.9 | 1.01 |

TABLE 3-continued

| SEQUENCE | FLUORESCENCE INDEX | ISO BRIGHTNESS | TOTAL % $O_3$ CONSUMPTION |
| --- | --- | --- | --- |
| Z Y | 0.79 | 84.1 | 1.00 |
| Z Y Z* | 0.34 | 85.2 | 1.02 |
| Z FAS | 0.72 | 83.2 | 1.00 |
| Z FAS Z* | 0.34 | 85.3 | 1.03 |
| Z H | 0.53 | 84.9 | 1.00 |
| Z H Z* | 0.32 | 85.7 | 1.02 |

NOTES:
All values shown are before reversion. Brightness and Fluorescence Index were measured with Technidyne's Technibrite Micro TB-LC spectrophotometer.
* = Split Addition Notice that total ozone charge is the same in all cases.

While the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. A process for reducing the fluorescence of recycle paper pulp fibers containing a fluorescent dye, which process comprises contacting the fibers with ozone, followed by contact with a bleaching agent other than ozone in a subsequent treatment, which bleaching agent treatment is then followed by a second treatment with ozone, with the amount of ozone being sufficient in the separate treatments to reduce the fluorescence of the treated fibers and the total amount of ozone used in both ozone stages is in the range of from about 0.2 to about 2.0 wt % based upon the dry weight of the pulp fibers treated; and wherein the fluorescence of the pulp fibers is reduced to such an extent that the fluorescence index of the resulting fibers is less than 0.7.

2. The process of claim 1, wherein the fibers are contacted with an aqueous washing or treatment solution in between the separate treatments of ozone.

3. The process of claim 1, wherein the fluorescence index of the resulting fibers is less than 0.6.

4. The process of claim 1, wherein the amount of total ozone used in the treatment is in the range of from about 0.5 to about 1.0 wt. % based upon the weight of dried fibers treated.

5. The process of claim 1, wherein the total amount of ozone used is in the range of from about 0.2 to about 1.5 wt. % based upon the dry weight of the pulp fibers treated.

6. The process of claim 1, wherein the amount of ozone used in each of the separate ozone treatment stages is about the same.

7. The process of claim 1, wherein the bleaching agent comprises hydrogen peroxide.

* * * * *